No. 751,810. PATENTED FEB. 9, 1904.
G. M. RICE.
APPARATUS FOR SEPARATING LIQUIDS FROM SOLIDS.
APPLICATION FILED JUNE 22, 1903.
NO MODEL. 3 SHEETS—SHEET 2.
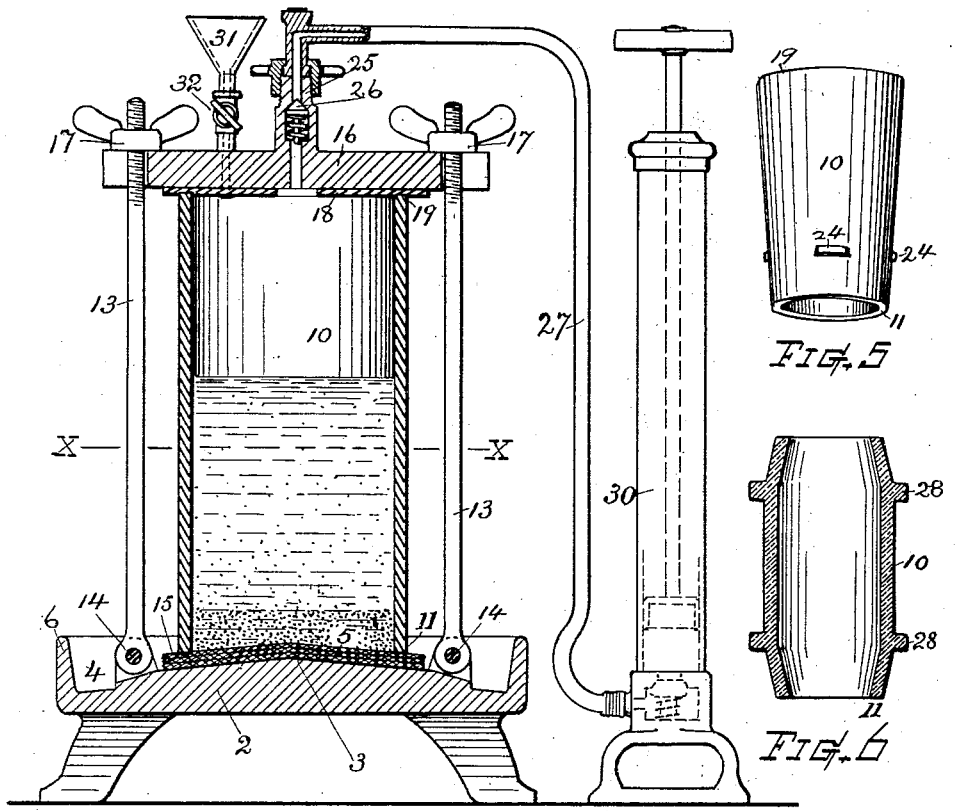
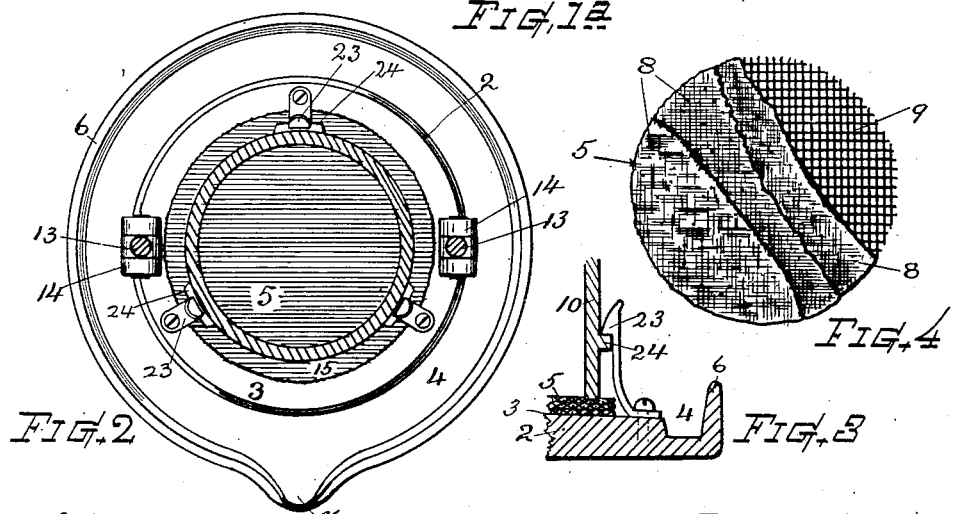
Witnesses
Inventor
George M. Rice

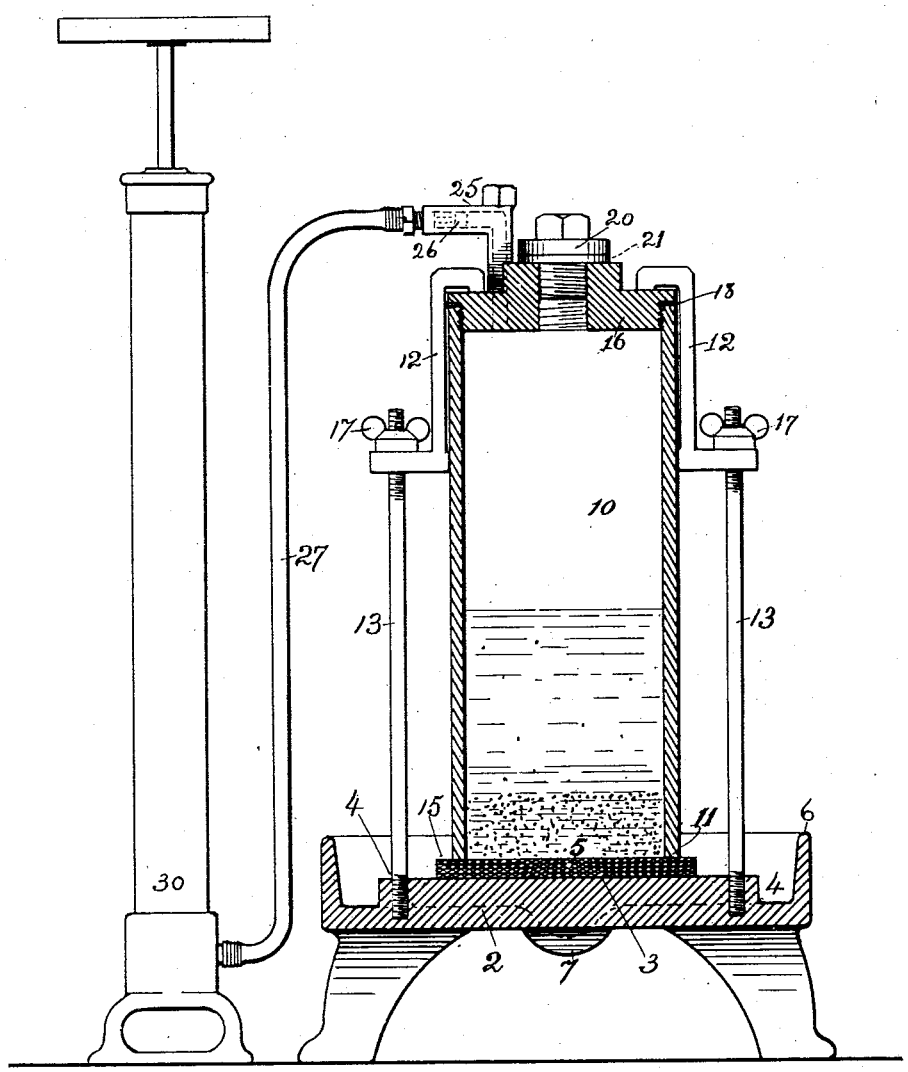

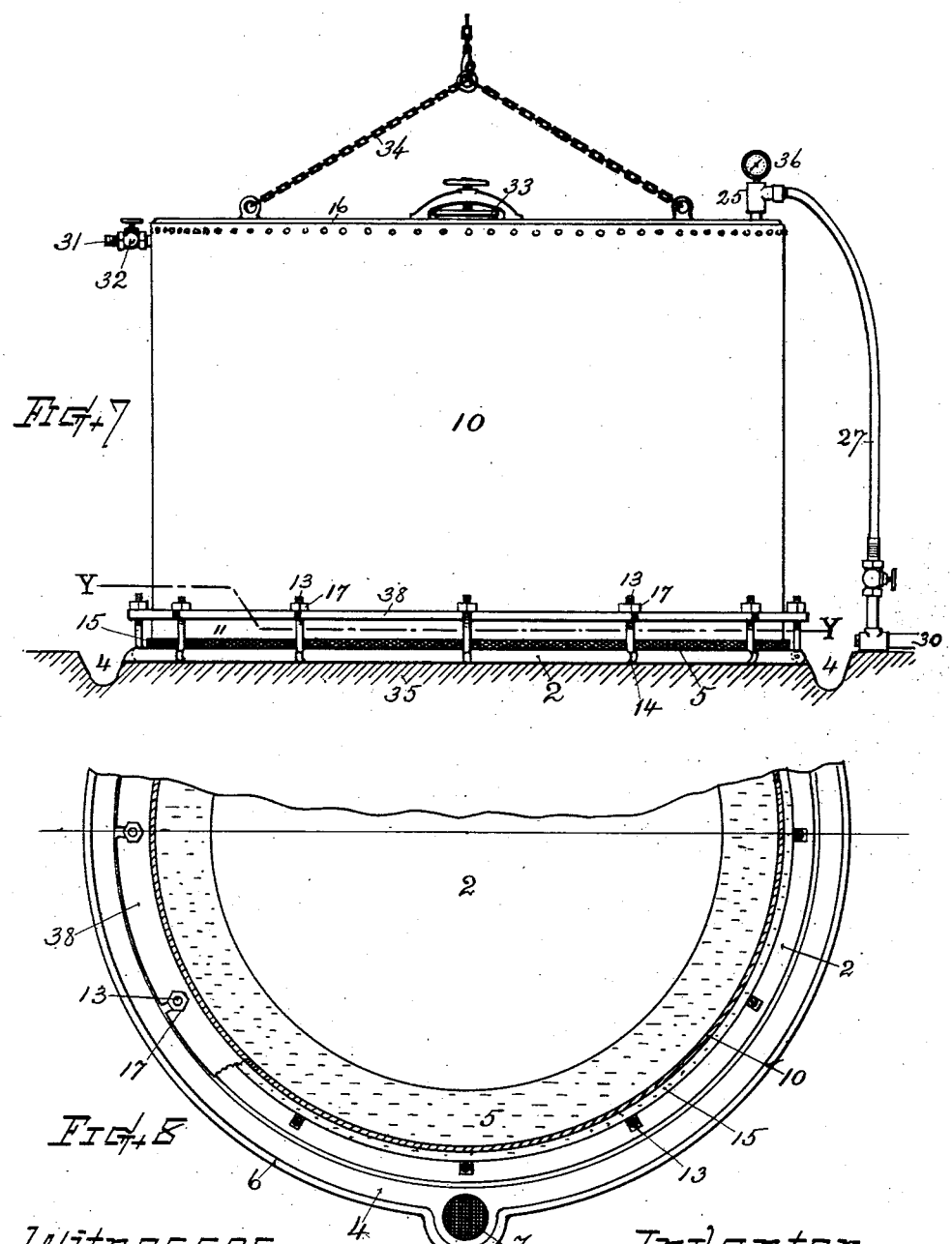

No. 751,810. Patented February 9, 1904.

UNITED STATES PATENT OFFICE.

GEORGE M. RICE, OF WORCESTER, MASSACHUSETTS.

APPARATUS FOR SEPARATING LIQUIDS FROM SOLIDS.

SPECIFICATION forming part of Letters Patent No. 751,810, dated February 9, 1904.

Application filed June 22, 1903. Serial No. 162,472. (No model.)

*To all whom it may concern:*

Be it known that I, GEORGE M. RICE, a citizen of the United States, residing at Worcester, in the county of Worcester and State of Massachusetts, have invented a new and useful Apparatus for Separating Liquids from Solids, of which the following, together with the accompanying drawings, is a specification sufficiently full, clear, and exact to enable persons skilled in the art to which this invention appertains to make and use the same.

This invention relates to apparatus adapted for separating liquids from solids, as in the preparation of drugs, medicinal preparations, and other laboratory work, or in the chemical treatment of ore for the recovery of precious metals and for filtrations in other branches of industry.

The object of my invention is to provide a simple and efficient apparatus for the purpose named that can be manufactured at comparative small cost, economically and conveniently operated, and which can be readily cleared, cleaned, and readjusted for repeated use.

To this end my invention consists in apparatus or mechanism the parts of which are constructed, combined, and organized for operation in the manner explained in the following detailed description, and illustrated by the accompanying drawings, wherein—

Figure 1 represents an elevation view, partly in section, of an apparatus embodying my invention as adapted for laboratory purposes. Fig. 1ª is a similar view showing a removable top of modified structure. Fig. 2 is a horizontal section of the same at line X X on Fig. 1ª. Fig. 3 is a detail sectional view showing a means for temporarily retaining the container-cylinder in place upon the bed. Fig. 4 is a detail plan view showing a construction for the filter-pack. Figs. 5 and 6 represent, on smaller scale, modified forms of container-cylinders. Fig. 7 represents a side view of apparatus embodying my invention as adapted for the treatment of material in large quantities at each charge, as in sewage-purification works and plants for the soluble extraction of ores; and Fig. 8 represents a part plan or horizontal section of the same at line Y Y on Fig. 7.

My improved apparatus comprises a bed-plate, stand, or platform having a filter-seating surface and liquid-receiving channel, a removable container or cylinder with means for closing its upper end and means for securing it to the bed, and a filter-pack disposed between the end of the container-cylinder and bed and extending to or beyond the outer periphery of the container-rim, also means for inducing air-pressure within the container above the liquid or semiliquid contents which is under treatment. These several parts are preferably constructed and combined for operation in a manner that will now be more definitely explained.

Referring to the drawings, the part indicated by the numeral 2 is the supporting platform or bed, preferably formed solid and fitted with a filter-seating surface 3 and a surrounding channel 4, with a standing outer rim or guard-flange 6 to prevent overflow. For small or moderate sized apparatus the bed is made as a stand or plate mounted on legs of greater or less length, as desired; but for large apparatus the bed may be formed of or supported upon a suitable foundation of any suitable material. The filter-seating surface is formed flat, slightly conical, or higher at the center than at its edges, and the channel 4 is provided with a suitable outlet or spout 7.

The filter-pack 5 is made of somewhat greater diameter than the end of the container or cylinder and may consist of any suitable filtering medium. In the present instance there is shown a pack consisting of several thicknesses or plies of canvas or woven fabric 8, overlying each other, and when desired these may be underlaid with a foraminous metal plate or sheet of woven-wire netting 9, (see Fig. 4,) although in some instances the netting or perforated metal plate 9 can be omitted. It is, however, in many instances desirable, especially in apparatus of small size. The filter-pack 5 rests firmly upon the seating-surface 3 of the bed 2, which latter is preferably non-perforated.

The container 10 consists of a tubular shell, preferably of cylindrical form and having an open lower end, the rim edge of which is adapted to rest upon the top surface of the filter-pack 5, as at 11, but with the edge 15 of the filter-pack projecting beyond the periphery of said container-rim. The container is removably combined with the bed and filter-pack, so that it can be raised or taken therefrom for discharging the solid substances after the liquid has been separated from it.

For removably securing the container 10 to the bed 2 I preferably employ clamp-bolts 13, having their lower ends fixed to the bed or joined thereto by a link, hook, hinge-joint, or other suitable attachment 14, while their upper ends are adapted to engage in suitable slots in the top piece 16, or a retaining-yoke or hooks 12 at the exterior of the container, and said bolts are provided with screw-nuts 17, threaded thereon for tightening and loosening the attachment.

The head, cap, or top 16 of the container may be screw-threaded or otherwise attached to the cylinder. In Fig. 1ª it is shown made as a removable top plate, which is a convenience in laboratory practice, the top being provided with a packing member 18 and the container-cylinder formed with an entire open top end 19, upon the rim of which this top plate rests and is held in place by the bolts 13.

If desired, the top can be made as a screw-cap, threaded upon the end of the tubular container, and hooks or a yoke provided therefor for receiving the clamping-bolts 13 and nuts 17 for holding the container to the bed.

For temporarily retaining the container in position upon the bed and filter-pack while its top is open for filling and the clamp-bolts unfastened I provide catch devices 23, attached to the bed and adapted to engage with a lug or flange 24 on the exterior of the container. An example of means for this purpose is shown in Fig. 3.

Arranged at the top of the container there is a tube-coupling 25, preferably provided with a check-valve 26 and adapted for the connection therewith of a pipe or hose 27, leading from an air-compressor mechanism 30, by which compressed air can be forced into the upper part of the container. There is also provided at the top of the container means 31 for the introduction of water or liquid for a purpose hereinafter specified. This means preferably consists of an inlet-way having a stopper 20, a funnel-tube or a coupling 31, with a stop-cock 32 for opening and closing the passage, as required.

The container-cylinder can be somewhat modified in form and material according with the requirements of practice and the class of material to be treated. Fig. 1 shows it made as a plain cylinder of uniform diameter open at both ends; but in some instances it may be made in tapered form, as shown in perspective, Fig. 5, or, again, for some laboratory purposes a container formed of glass, porcelain, or similar material may be employed which can be made, as shown in section, Fig. 6, with exterior flanges or ribs 28 to assist in connecting the clamp-bolts 13 or suitable fastening devices, whereby it is secured to the bed 2 and to the removable top piece. Either of these forms of container of proper size can be interchangeably employed with the same bed and filter-pack as that shown in Fig. 1 or Figs. 1ª and 2.

In Figs. 7 and 8 I have illustrated my invention as adapted for the treatment of material in large quantities in each charge and as applicable in sewage-purification works or plants for the soluble extraction of metals from ores, more especially as in the cyanid process of extracting gold and silver. When the apparatus is of large dimension and for metallurgical purposes or when the container is designed to hold several tons of material at a single charge, the construction is modified by making the top or head piece 16 permanently attached to the cylinder 10 and providing therein a manhole or cover 33 of suitable size for filling in the charge. The container is also provided with a recessed flange or ledge 38 near its lower end for receiving the clamp-bolts 13, which can thus be of short length. It is also preferably provided with a chain bail 34 or means for connecting it with a derrick or hoisting mechanism for lifting it from the filter-pack and bed, which latter is shown as laid on a foundation of concrete 35 or other suitable formation. The filter-pack 5 for this large construction can be formed as an annular pad extending around the circle under the edge of the container and spreading outward and inward therefrom for a suitable distance, but without a center portion, as illustrated in Fig. 8. A pressure-gage 36 is arranged in connection with the container for indicating the degree of air-pressure within its chamber.

In the operation the mingled solid and liquid materials to be treated or separated are charged into the container 10 at its open top end while the container-cylinder rests upon the filter-pack 5, which lies flat upon the surface of the bed 2, the cylinder being meanwhile retained in place by the fasteners. After the charge is entered the top is closed and firmly clamped, making an air-tight closure. Air is then forced into the upper part of the container through the connection 25 and pipe 27 from the compressor 30 and the liquid is caused to filter out through the filter-pack 5 at the portion between the container-rim 11 and surface of the bed and flows into the channel 4, from which it can be collected at the spout 7. As the liquid is expelled the solid matter is deposited in a cake at the bottom of the container. After the separation, if it is desired to further extract elements of value that may then remain in the caked mass the air-pressure can be relieved and by way of the stopper 20 or the coupling or funnel 31, opened by valve 32, a quantity of water or liquid can readily be introduced above the mass, the valves closed, and the air-pressure renewed for driving such water or liquid through the cake for leaching out the contained valuable elements, thereby carrying the extraction to a very close percentage.

The degree of pressure employed can be easily varied to meet the requirements of different substances or the speed at which it is desired to force the liquid separation by working the compressor to a greater or less power, the amount of pressure in the larger apparatus being shown by the indicating-gage 36.

When the separating operation is completed, the operator loosens the nuts and releases the clamp-bolts, and the container is then raised or removed from the filter-pack and bed and the cake or mass of concentrated solid material is cleared therefrom, the filter-pack cleaned or renewed, if desired, and the container replaced and adjusted for a repetition of the operation.

The above-described apparatus is peculiarly advantageous for use in treating ore by the cyanid process, since an apparatus of sufficient size can be constructed and operated at a comparatively small cost and expense for maintenance and labor.

It will be understood that I do not broadly claim the use of air-pressure in filtering apparatus, since such pressure has been employed in differently-constructed apparatus heretofore.

I am aware that changes may be made in the form and structure of my invention by those skilled in the art without departing from the nature and scope thereof as expressed in the claims. Therefore I do not wish to be limited to the special form of construction herein shown.

What I claim as of my invention, and desire to secure by Letters Patent, is—

1. The combination as described, of the filter-supporting bed, a removable tubular container having an open bottom adapted for support upon said bed, a filter pack or medium disposed between the container and bed, and projecting beyond the rim thereof, a close-fitting cover or top, and means for attaching an air-pipe thereto, means for confining said container in position, substantially as set forth.

2. The combination, of the supporting-bed having the filter-seating surface and drainage-way, the removable open-bottom cylinder supported thereon, the filter-pack between said cylinder and bed, detachable clamping means connecting said cylinder and bed, a tight-closing cap for the top of said cylinder, an inlet-opening therethrough, and an air-pressure connection having a check-valve therefor, and means for supplying air under pressure through said inlet-opening.

3. In a separator apparatus of the character described, in combination with the supporting-bed and removable open-bottomed container-cylinder; the filter-pack consisting of a foraminous metal base and superposed sheets of fibrous material, said filter-pack having a diameter of greater dimension than the cylinder, and extending across and beyond the outside of the cylinder-rim, substantially as set forth.

4. A separator mechanism comprising the non-perforated supporting bed or platform provided with a conically-raised center surface, a circumferential drainage-channel and rim-flange; in combination with the removable container-cylinder, a filter-pack resting upon said bed and extending beyond the periphery of the container, means for securing the container in position, and means for inducing air-pressure within said container.

5. The combination, with the supporting bed or platform having the filter-seating surface and drainage-channel, and the filtering medium resting upon said surface; of a removable open-bottom container of the character described, disposed with its lower end rim seated upon said filter medium, and means in connection with the bed and container for temporarily retaining the container in position thereon.

6. An apparatus for the purpose specified, comprising a supporting-bed having an approximately flat filter-seating surface with a surrounding channel and guard-rim, the removable open-bottomed container, a filter-pack disposed between the end of the container and bed-surface, means for closing the top of said container, means for detachably securing the container to the bed, an air-compressor mechanism, an air-conducting conduit connecting said air-compressor and container, a valve for the connecting air-passage, an inlet-way for introduction of liquid at the upper part of the container, and a shut-off valve in said inlet-way.

Witness my hand this 16th day of June, 1903.

GEORGE M. RICE.

Witnesses:
CHAS. H. BURLEIGH,
SIMEON E. KING.